3,286,904
COATED ALUMINUM ARTICLES

Richard D. Vieth, Butler, and Joseph A. Dooley, Cedar Grove, N.J., and Richard Bolstad, Brooklyn, and Elihu J. Aronoff, Glen Oaks, N.Y., assignors to Interchemical Corporation, New York, N.Y., a corporation of Ohio
Filed Jan. 31, 1964, Ser. No. 341,699
17 Claims. (Cl. 229—4.5)

This invention relates to novel coated aluminum foil, particularly novel articles of coated aluminum foil.

While thick sheets and slabs of aluminum have low moisture and cps. permeability, aluminum foil, particularly aluminum foil having a thickness of under 1 mil. has a higher permeability to moisture vapor and cps. This increased permeability is undesirable in aluminum foil used for food packaging especially in aluminum foil used as inner liners in laminated aluminum foil cans for beverages. Aluminum foil inner liners must be of low permeability to aqueous liquids and moisture vapor so as to prevent seepage of the liquid and moisture vapor in the can through the liner into the interior structure of the laminated can. Likewise, in other applications such as dehydrated foods, it is important that no moisture or oxygen be permitted into the wrapper or receptable.

We have now discovered novel coated aluminum sheets and foils which have a very low moisture and gas permeability even where the foil thickness is less than 1 mil. These novel coated aluminum sheets are made by coating the aluminum substrate with a copolymer of at least 70% vinylidene chloride and a major portion of the remainder, preferably at 15% of the copolymer weight, being an acid selected from the group consisting of itaconic acid and acrylic acids (which is meant to include both acrylic and methacrylic acids.) These copolymers and novel coating compositions thereof are described in copending applications S.N. 341,701 in the names of R. Bolstad, E. Aronoff, P. Whyzmuzis and E. Maloney filed on January 31, 1964, the filing date of the present application and entitled "Novel Compositions of High Vinylidene Chloride-Content Copolymers." This copending application is incorporated by reference into the present application.

Most preferably the copolymers contain 75% vinylidene chloride and 25% of the acid component. It should be noted that in the present specification and claims all proportions are by weight unless otherwise set forth.

While the coating compositions of the copending application which contain $C_1$ to $C_4$ alcohol solvents as well as combinations of these alcohols with hydrocarbon solvents may be used in applying the copolymers to aluminum foil, the ester and ketone solvents are preferably used. The ester solvents used may include butyl acetate, isopropyl acetate, n-propyl acetate, ethyl acetate and methyl acetate, and the ketones used may include methyl ethyl ketone, acetone and methyl isobutyl ketone.

The novel copolymers have a molecular weight in the range of preferably 3,000 to 5,000. In addition to the vinylidene chloride and the acid components, the novel copolymers may contain small amounts of a wide variety of olefinicially unsaturated monomers as described in said copending application.

The coatings described above exhibit excellent adhesion to the aluminum substrate. As far as we know, no prior coating of a high vinylidene chloride-content copolymer has exhibited adhesion of this extent to aluminum foil. Such copolymers in coatings are commercially available under the trademark Saran. These were tried and found not to have any adhesion to aluminum foil.

The aluminum foil may be coated in any conventional manner including gravure cylinder coating, roller coating, spraying and flexographic coating.

The coated aluminum foil of this invention is heat sealable, that is two coated surfaces of the aluminum foil may be sealed together by placing the coated surfaces against each other and heating the coating preferably to about 300 to 325° F. in conventional heat sealing equipment to fuse the coatings. Seams of adjacent strips and sheets of the coated aluminum foil may be heat sealed to provide aluminum foil packages of very low moisture vapor and gas permeability.

The coated aluminum foil of this invention provides highly desirable inner liners for laminated aluminum foil cans. These are usually constructed of a hollow cylinder of a fibrous material such as paper, particularly cardboard which provides the structural support for the can and an aluminum liner which contacts the inner walls of the cardboard cylinder. The can usually also contains a decorated or printed surface or aluminum foil on the outside of the cardboard cylinder.

The conventional liner is constructed of helically wound alternating strips of aluminum foil, the lateral edges of one of said alternating strips overlapping both lateral edges of the other strip. It is in this area of overlap that the strips are bonded together. Conventionally the bonding has been done by means of an adhesive.

The drawings, show the construction of a can liner of coated aluminum foil in accordance with this invention:

Figure 1:
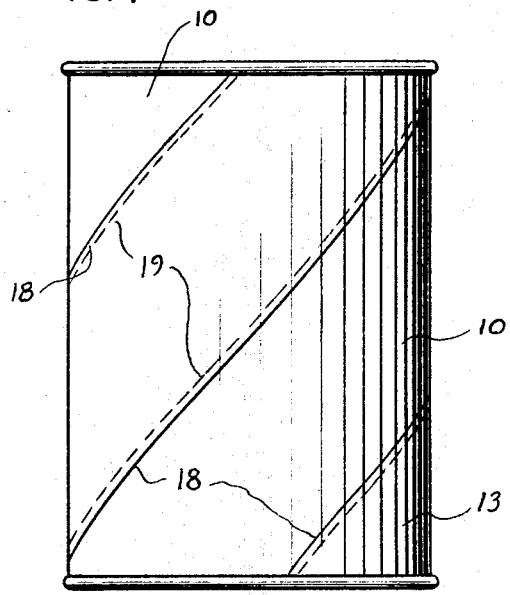
FIG. 1 is a diagrammatic elevation view of the cylindrical liner.
Figure 2:
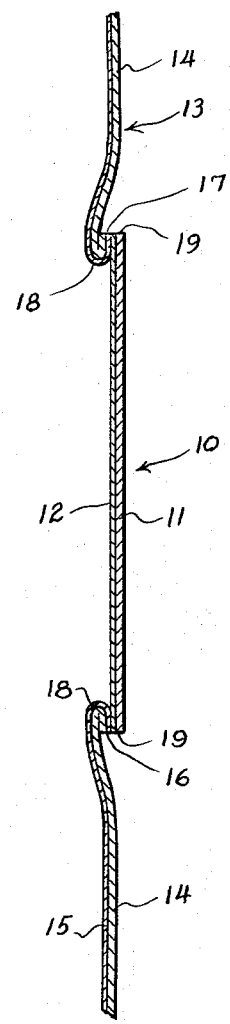
FIG. 2 is a cross-sectional view of the two seams in the liner construction.

Referring to FIGS. 1 and 2, the can liner is cylindrical and is constructed of a pair of alternate helically wound strips of aluminum foil coated with the high vinylidene chloride-content/acid compositions described above. One strip 10, which comprises aluminum foil 11 and coating 12, has both of its lateral edges overlapped by the other strip 13, which comprises aluminum foil 14 and coating 15. Strip 13 has its lateral edges folded under to form flaps 16 and 17 which overlap the lateral edges of strip 10. This insures a coating to coating contact at the seams where coating 15 is fused to coating 12 by heat sealing. The areas of overlap are shown in FIG. 1 as the narrow spaces between the solid diagonals which represent the lateral extremities 18 of flapped strip 13 and the dotted liner which represent the lateral edges 19 of strip 10.

Figure 3:
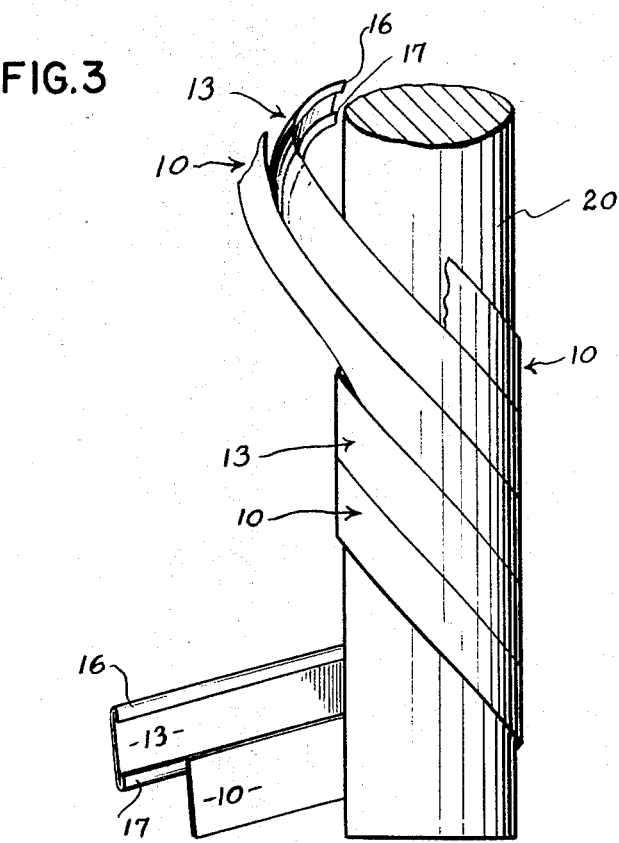
FIG. 3 shows a simple method of winding the alternate strips into a can liner.

FIG. 3 shows one method of construction of the inner liner of this invention. The pair of alternate strips are wound in the partially overlapping helical manner described above around mandrel 20. Fusion of the overlapping coatings to heat seal the structure is accomplished either by heating the whole mandrel to preferably from 300° to 325° F. This may also be done by heating to said temperature a portion of the mandrel over which the seams must pass during winding.

Figure 4:
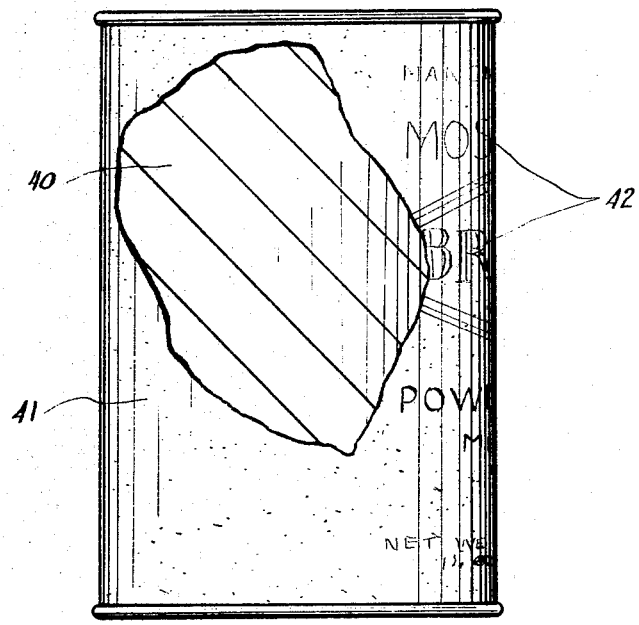
FIG. 4 is a diagram of a laminated aluminum foil can with part of the outer cardboard cylinder broken partially away.

FIG. 4 diagrammatically shows a laminated aluminum foil can with part of the outer cardboard cylinder broken partially away. Inner liner 40 is constructed of the coated aluminum foil strips. Cardboard cylinder 41 constitutes the outside of the can. This outer cardboard cylinder may contain printing 42.

It should also be noted that the cardboard cylinder which forms the supporting structure of the laminated can may also be formed of a pair of alternating cardboard strips and even a single cardboard strip which are helically wound superimposed upon the inner liner while the same is still on the mandrel. Any conventional adhesive may be used to bond the inner coated aluminum foil to the supporting cardboard cylinder.

The following examples will illustrate the production of the coated aluminum foil:

Example 1

|  | Parts by weight |
|---|---|
| Vinylidene chloride | 75 |
| Acrylic acid | 25 |
| Ethyl acetate | 54 |
| Lauryl peroxide | 3 |

The above ingredients are placed in a kettle and maintained at a temperature of 60° C. under an inert atmosphere for 17 hours with continuous agitation. There is a 98% conversion of monomers to copolymer.

Example 2

|  | Parts by weight |
|---|---|
| Vinylidene chloride | 75 |
| Acrylic acid | 25 |
| Methyl ethyl ketone | 54 |
| Lauryl peroxide | 3 |

Following the procedure and conditions of Example 1, the above ingredients are reacted with over a 98% conversion of monomers to copolymer.

Example 3

|  | Parts by weight |
|---|---|
| Vinylidene chloride | 75 |
| Methacrylic acid | 25 |
| Methyl ethyl ketone | 100 |
| Lauryl peroxide | 3 |

Following the procedure and conditions of Example 1, the above ingredients are reacted with over a 95% conversion of monomers to copolymer.

Example 4

|  | Parts by weight |
|---|---|
| Vinylidene chloride | 78 |
| Itaconic acid | 22 |
| Methyl ethyl ketone | 100 |
| Lauryl peroxide | 1.5 |
| Acetyl peroxide | 1.5 |

The above ingredients are reacted in accordance with the procedure and conditions of Example 1 with a 98% conversion of monomers to copolymer.

Example 5

|  | Parts by weight |
|---|---|
| Vinylidene chloride | 75 |
| Ethyl acrylate | 10 |
| Acrylic acid | 15 |
| Ethyl acetate | 54 |
| Lauryl peroxide | 3 |

The above ingredients are reacted in accordance with the procedure and conditions of Example 1 with a 98% conversion of monomers to copolymer.

Example 6

A solution is prepared of 25 parts of the copolymer of Example 1 in 75 parts of ethyl acetate. The solution is then coated upon aluminum foil of a thickness of 0.35 mil. and a moisture vapor transmission[1] of 1.30 g./100 sq. inches/24 hours at a dry coating thickness of 0.5 lb./100 sq. ft. and the coating is heated at 250° F. for about 2 to 3 seconds. The resulting coating is clear, white, displays excellent adhesion to the aluminum foil. The created foil has a moisture vapor transmission of less than 1.0 g./100 sq. inches/24 hours.

Example 7

A solution of 25 parts of the copolymer of Example 2 in 75 parts of methyl ethyl ketone is prepared. Following the procedure and conditions of Example 6, this solution is coated on aluminum foil. The resulting coating has all of the desirable properties of the coating of Example 6.

Example 8

Using the procedure, ingredients, proportions and conditions of Example 6 except that the copolymer of Example 3 is used in place of the copolymer of Example 1, coated aluminum foil is prepared. The resulting coated foil has the same desirable properties as the coated foil of Example 6.

Example 9

Using the procedure, ingredients, proportions and conditions of Example 6 except that the copolymer of Example 4 is used in place of the copolymer of Example 1, coated aluminum foil is prepared. The resulting coated foil has the same desirable properties as the coated foil of Example 6.

Example 10

Using the procedure, ingredients, proportions and conditions of Example 6 except that the copolymer of Example 5 is used in place of the copolymer of Example 1, coated aluminum foil is prepared. The resulting coated foil has the same desirable properties as the coated foil of Example 6.

While there have been described what is at present considered to be the preferred embodiments of this invention it will be obvious to those skilled in the art that various changes and modifications may be made therein without departing from the invention, and it is, therefore, aimed to cover all such changes and modifications as fall within the true spirit and scope of the invention.

What is claimed is:

1. An article comprising an aluminum substrate carrying a thermoplastic coating of a copolymer comprising from 70% to 80% vinylidene chloride and at least 15% of an acid component selected from the group consisting of acrylic acid and methacrylic acid.

2. The article of claim 1 wherein said acid component is acrylic acid.

3. The article of claim 1 wherein said acid component is methacrylic acid.

4. The article of claim 1 wherein said substrate is an aluminum foil having a maximum thickness of 1.0 mil.

5. An article comprising an aluminum foil carrying a thermoplastic coating of a copolymer of 75% vinylidene chloride and 25% acrylic acid.

6. An article comprising an aluminum foil carrying a thermoplastic coating of a copolymer of 75% vinylidene chloride and 25% methacrylic acid.

7. An article comprising alternating strips of aluminum foil, each strip having one surface coated with a copolymer comprising 70% to 80% vinylidene chloride and at least 15% of an acid component selected from the group consisting of acrylic acids and itaconic acid, one of said strips having its lateral edges folded under itself so as to provide a pair of coated edges along the uncoated side of the strip, said coated edges overlapping and being bonded to the edges of the coated surface of the alternate unfolded strip.

8. The article of claim 7 wherein said acid component is acrylic acid.

9. The article of claim 8 wherein the copolymer

---

[1] Moisture vapor transmission is determined by covering the mouth of a cup of a selected diameter containing calcium chloride with the material to be tested, exposing the cup to an atmosphere of about 95 to 100 relative humidity for 24 hours and then determining the gain in weight of the calcium chloride.

comprises 75% vinylidene chloride and 25% acrylic acid.

10. The article of claim 7 wherein the acid component is itaconic acid.

11. The article of claim 10 wherein the copolymer comprises 75% vinylidene chloride and 25% itaconic acid.

12. A receptacle of low moisture permeability comprising a hollow cylindrical housing of a porous material and a cylindrical liner contacting the inner walls of said housing, said liner being constructed of helically wound alternating strips of aluminum foil each strip having one surface coated with a copolymer comprising 70% to 80% vinylidene chloride and at least 15% of an acid component selected from the group consisting of acrylic acids and itaconic acid, one of said strips having its lateral edges folded under itself so as to provide a pair of coated edges along the uncoated side of the strip, said coated edges overlapping and being bonded to the edges of the coated surface of the alternate unfolded strip.

13. The receptacle of claim 12 wherein said acid component is acrylic acid.

14. The receptacle of claim 13 wherein the copolymer comprises 75% vinylidene chloride and 25% acrylic acid.

15. The receptacle of claim 12 wherein said acid component is itaconic acid.

16. The receptacle of claim 15 wherein the copolymer comprises 75% vinylidene chloride and 25% itaconic acid.

17. The receptacle of claim 10 wherein said porous material is paper.

References Cited by the Examiner
UNITED STATES PATENTS

| | | | |
|---|---|---|---|
| 2,570,478 | 10/1951 | Pitzl. | |
| 3,147,902 | 9/1964 | Miller | 229—4.5 |
| 3,156,401 | 11/1964 | Krause | 229—4.5 |

JOSEPH R. LECLAIR, *Primary Examiner.*